UNITED STATES PATENT OFFICE.

L. ELL HURD, OF CINCINNATI, OHIO, ASSIGNOR OF ONE-HALF HIS RIGHT TO JOHN G. ELLIS, OF SAME PLACE.

IMPROVEMENT IN ANTI-INCRUSTATION COMPOUNDS.

Specification forming part of Letters Patent No. 190,436, dated May 8, 1877; application filed November 8, 1876.

*To all whom it may concern:*

Be it known that I, L. ELL HURD, of Cincinnati, Hamilton county, Ohio, have invented a new and useful Compound for Preventing and Removing Scale in Steam-Boilers, of which the following is a specification:

My compound comprises a number of ingredients, of which some operate to dissolve the incrustation, and others act as absorbents, &c., of the lime and other deleterious matters thus liberated or which are suspended in the water. In this way my compound is equally useful as a cure and as a preventive of incrustation.

My compound consists of the following ingredients: Best English soda-ash, one hundred and fifty pounds; sal-ammoniac, fifteen pounds; wood charcoal, ten pounds; gum-catechu, ten pounds; linseed-oil cake, ten pounds; oak bark, five pounds—all to be ground fine and thoroughly mixed together. It is then ready for use.

The above proportions are based on an estimate of full merchantable strength, and should be increased in the case of any ingredient of less strength.

In a boiler of two hundred and fifty to three hundred cubic feet, scale may be prevented by the use of two pounds each week of the compound, and in the same proportion for boilers of less or greater size.

Boilers already incrusted will require eight to ten pounds in one or several applications, according to the thickness of scale and quality of water used.

I claim as new and of my invention—

The compound for prevention and removal of scale in steam-boilers, composed of the ingredients hereinbefore designated in substantially the proportions named, viz: Best English soda-ash, one hundred and fifty pounds; sal-ammoniac, fifteen pounds; wood charcoal, gum-catechu and linseed-oil cake, each ten pounds; oak bark, five pounds—all ground fine and thoroughly mixed together.

In testimony of which invention I hereunto set my hand.

L. ELL HURD.

Attest:
   GEO. H. KNIGHT,
   L. H. BOND.